March 6, 1962  J. G. VALENTINO  3,024,399
PULSE-ACTUATED MOTOR DRIVING SYSTEM
Filed Sept. 4, 1958
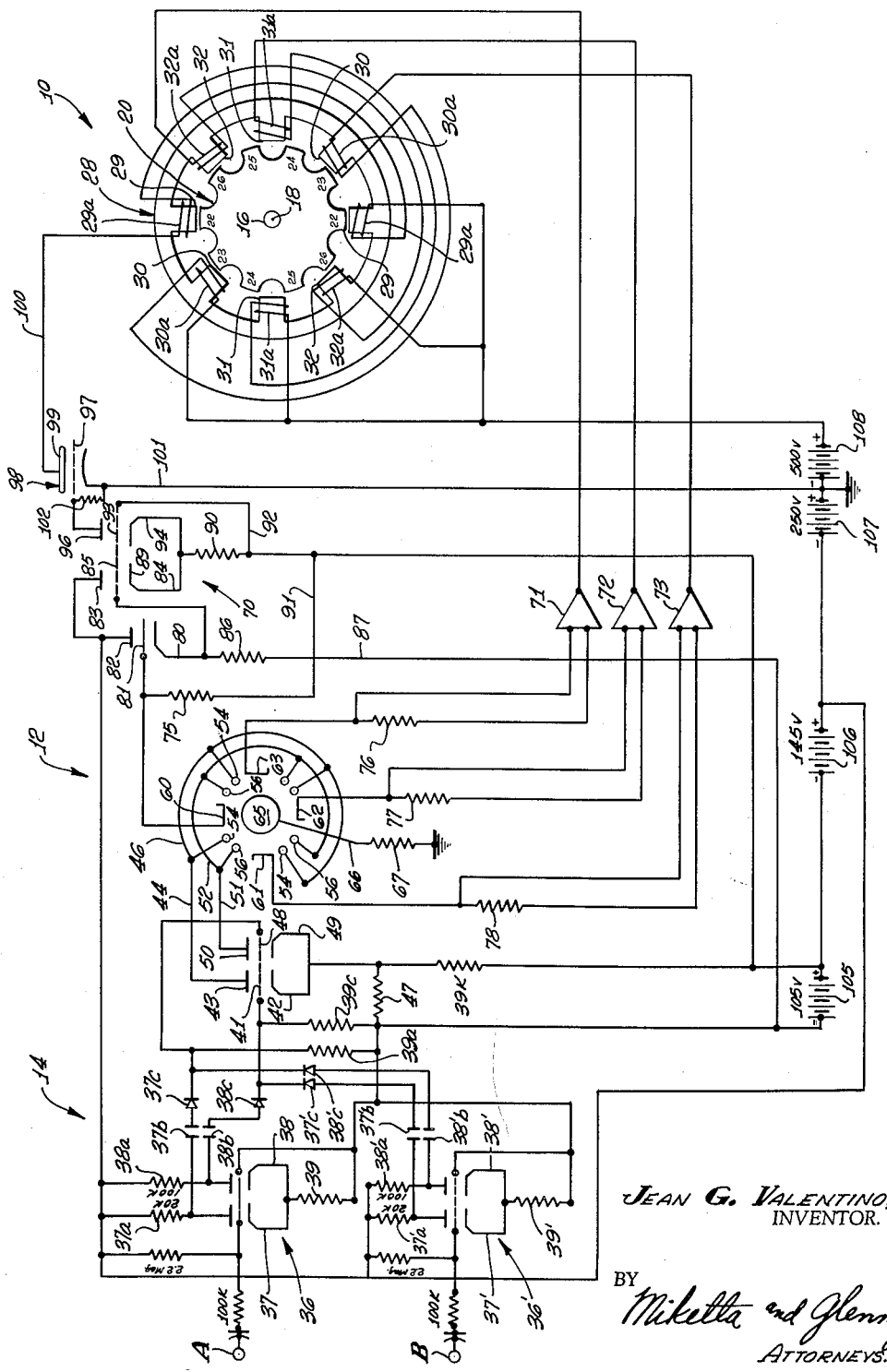
JEAN G. VALENTINO,
INVENTOR.
BY Miketta and Glenny
ATTORNEYS.

United States Patent Office 3,024,399
Patented Mar. 6, 1962

3,024,399
PULSE-ACTUATED MOTOR DRIVING SYSTEM
Jean G. Valentino, Los Angeles, Calif., assignor to Wiesner-Rapp Company, Inc., Buffalo, N.Y., a corporation of New York
Filed Sept. 4, 1958, Ser. No. 758,951
6 Claims. (Cl. 318—283)

This invention relates to an electronic drive system and circuit means for driving a motor means adapted to rotate in predetermined incremental angular amounts in a preselected direction, and more particularly to a commutating circuit means actuated by selected spaced pulses.

Generally speaking, an electronic drive system embodying this invention may be employed to drive a motor means of step type. The electronic drive system contemplated by this system may be utilized in installations wherein precise, controlled, incremental step-by-step rotation of a rotor means or motor driving shaft is required and is adapted for use wherever data or intelligence is desired to be transmitted in terms of incremental angular rotative displacement and in some instances in precise correlated manner with other data. Examples of uses of a step motor driven by this system include operation of controls for vehicles, machine tools, machining and processes, requiring accurate precise movement of mechanical parts, and in association with the reading and recording of computer information and telemetering information.

The present invention contemplates a motor means of step type in which a rotor member and a stator means are so arranged that selective energization of stator poles of the stator means will produce a preselected angular increment of rotation of the associated rotor member which may positively drive and control the motion of a driven element. Such selected incremental rotation is produced in response to selectively spaced discrete pulses emitted from a selected pulse generating source and wherein the selected spaced pulses are correlated to selected numerical data, information or intelligence relating to an operation to be performed. The present invention is particularly directed to means for transferring or converting the selected spaced pulses into means for selectively energizing in sequential relation stator poles provided in the stator means. An exemplary transfer means includes a switching means in the form of a counter tube means of cold cathode glow transfer type.

The primary object of this invention is to disclose and provide a novel, electronic drive system for a motor means.

An object of this invention is to disclose and provide an electronic commutating driving system actuated by selectively spaced discrete pulses for a motor means.

Another object of this invention is to disclose and provide a means for transferring or switching selectively received pulses to produce selective, precise incremental rotation of a rotor means of a motor for positively driving a driven member.

A further object of this invention is to disclose and provide an electronic drive system including switch means for sequentially causing energization of pairs of diametrically arranged stator poles, said switch means being energized by selectively spaced discrete pulses.

A still further object of this invention is to disclose and provide a novel electronic driving system including two selectively actuated pulse input or driving circuit means, one circuit means serving to produce incremental step motion in one direction and the other circuit means serving to produce step motion in the reverse direction.

Numerous other advantages and objects of this invention will be readily apparent from the following description and drawing in which an exemplary embodiment of this invention is illustrated.

The single figure of the drawing schematically shows the electronic commutating drive system of this invention.

Generally speaking, the drive system shown in the drawing comprises a motor means 10, a transfer or switch means 12 operatively connected with the motor means 10 and with a pulse-spacing means generally indicated at 14, said pulse-spacing means 14 including two input circuits and adapted to receive primary pulses from a source (not shown) which may comprise any suitable pulse-generating means.

The motor means 10 of step type is schematically illustrated and may comprise a rotor shaft 16 rotatable about a rotor axis 18, the said rotor shaft being provided with rotor means 20 comprising a plurality of precisely, selectively spaced diametrically arranged pairs of rotor poles 22, 23, 24, 25 and 26.

The motor means 10 also includes stator means 28 encircling the rotor means 20 and comprising a plurality of diametrically arranged pairs of stator poles 29, 30, 31, 32, each of said pairs of stator poles including an energizing coil wound therearound and identified as 29(a), 30(a), 31(a), 32(a). It will be noted that there is one more pair of rotor poles than there are pairs of stator poles; in this example, five pairs of rotor poles and four pairs of stator poles. It will be understood that the number of pairs of stator poles and rotor poles may be more or less than those shown and that the number of pairs of rotor poles may be equal to the number of pairs of stator poles as for example, when a plurality of separate rotor and stator units are assembled circumaxially and rotor units are displaced with respect to each other in preselected angular offset relation.

It may be further noted in the drawing that while pairs of rotor and stator poles 22, 22, 29, 29 are in alignment, adjacent pairs of stator and rotor poles 23, 23, 30, 30 and 26, 26, 32, 32, are in only partial alignment and that the next adjacent pairs of rotor and stator poles 24, 24, 31, 31 and 25, 25, 31, 31, are out of alignment, that is, the end faces of rotor poles 24, 25 do not oppose the end faces of stator poles 31.

Commutating circuit means for sequentially energizing the pairs of stator poles 29, 29, 30, 30, 31, 31, 32, 32 so as to produce sequential, incremental rotation of rotor means 20 as by causing rotor poles 23, 23 to move into directly opposite relation with stator poles 30, 30, will be described by first referring to an actuating pulse which is received from the pulse-generating source (not shown) mentioned above by the commutating circuit means at A and B. In this example, the actuating pulse received at A will produce rotation of the rotor means 20 in one direction while an actuating pulse received at B will produce rotation of the rotor means in the opposite direction. For purpose of brevity, the circuit means relating to the reception of pulses at A will be described in detail, the pulses received at B being transmitted and providing operation of the drive system in similar manner, but producing opposite rotation as above mentioned. Like parts at B will be given the same reference numeral with a prime sign.

An actuating pulse at A may be received by pulse input or driving circuit 36 for changing said pulse into two closely spaced pulses S and $S_2$, and said circuit means 36 may include a suitable well known multivibrator arrangement. In this example, multivibrator means 36 may include vacuum tubes 37, 38 of triode type. The actuating pulse is fed to the grid of tube 37 which, through the arrangement of multivibrator circuit components associated with tube 37, namely, resistance 37a, capacitor 37b, diode 37c; the circuit components for tube 38, namely resistance 38a, capacitor 38b, rectifier 38c, and the components on the cathode side of the tubes 37, 38, namely resistances 39, 39a and 39b, produces the two pulses S, and S₂ in close spaced-in-time relation. Pulse S first energizes the grid 41 of a vacuum tube 42 and then the following pulse S₂ energizes the grid 48 of a vacuum tube 49. Tubes 42 and 49 may have a common lead to their cathodes and include circuit resistance component 47.

Plate 43 of tube 42 may be connected by lead 44 to a guide bus 46 and similarly plate 50 of tube 49 may be connected by lead 51 to a guide bus 52. The guide buses are associated with the counting tube means 12.

The pulse input or driving circuit means 36 may thus serve to drive the counting tube means 12 in one direction and the driving circuits means 36′ may drive the tube means 12 in the reverse direction. Circuit components 37a, 37c, 38a, and 38b may be diodes used to permit the driving pulses to pass to and operate the counting tube means 12 and to isolate the driving circuits one from the other so that the output of one circuit is not loaded by the circuit of the other.

Counting tube means 12 may be a cold cathode glow transfer counter tube and includes a plurality of equally spaced cathodes 60, 61, 62, 63 arranged in uniform spaced relation about a centrally positioned anode 65 which may be connected to ground through a lead 66 and resistance 67. In each space between adjacent cathodes may be disposed two guide elements or pins 54 and 56, all of pins 54 being connected to guide bus 46 and all of pins 56 being connected to guide bus 52.

The cathodes 60, 61, 62, 63 of the counting tube are connected respectively to direct current amplifiers 70, 71, 72, 73, only amplifier 70 being illustrated with circuit components and it is understood the other amplifiers include similar components. Resistances 75, 76, 77, 78 are provided in respective cathode circuits to the amplifiers. Amplifier 70 may include a triode vacuum tube 80 having a grid 81 connected to cathode 60, the plate 82 being connected to plate 83 of vacuum tube 84. The cathode of tube 80 may be connected to the grid 85 of tube 84 and through resistance 86 to lead 87. Tube 84 has its cathode 89 connected through resistance 90 to lead 91 provided with resistance 75 and also through lead 92 to the grid 93 of tube 94 whose cathode is also connected to resistance 90. The plate 96 of tube 94 is connected to grid 97 of a final tube 98 having its plate 99 connected to lead 100 which connects to stator coil 29a. The cathode of tube 98 is connected to lead 101 and to a resistance 102 between grid 97 and plate 96.

In operation of the drive system and circuit means described above, power sources 105, 106, 107 and 108 are provided for selected voltage and arranged for energization of the several circuits shown in the drawing. When the circuits are energized, anode 65 of the counter tube switch means 12 becomes positive and a conducting path of ionized gas is formed and extends between anode 65 and one of the cathodes, for this example cathode 60. Only one path is formed because of resistance 67 between anode 65 and its ground. It will be apparent that with current flowing from cathode 60 to anode 65, the resistance 75 produces a voltage drop which is fed to the amplifier means 70 which produces current flow through the stator coils 29a, 29a around the stator poles 29, 29 to produce a magnetic field which attracts and holds in alignment the rotor poles 22, 22. It will be noted that the final tube 98 if the direct current amplifier means 70 is provided in a circuit including power source 108 of sufficient power so as to suitably energize the stator coils 29a, 29a.

When an actuating pulse is received at A and energizes the grid of tube 37 of the multivibrator means 36, then the energized multivibrator circuit produces two closely spaced pulses S₁ and S₂. Pulse S₁ energizes the grid of the tube 42 and a pulse is emitted from tube 42 to the guide bus 46 of the cold cathode glow counter tube and to guide pin 54 which is directly adjacent in counterclockwise relation to the cathode 60. The effect of the pulse at guide pin 54 is to produce a transfer of the cathode end of the conducting path of ionized gas to the guide pin from cathode 60. In closely spaced time sequence, the secondary pulse S₂ energizes tube 49 to produce another pulse which is directed to the guide bus 52 and to the associated guide pins 56. The effect of the pulse produced by the second pulse S₂ is to again transfer the cathode end of the conducting path of gas to guide pin 56 from the guide pin 54. Since the cathode end of the conducting path of gas is now remote from cathode 60 and proximate to cathode 61 and the circuit including cathode 60 has become de-energized, the circuit including cathode 61 now becomes energized and the conducting path of gas flows between cathode 61 and anode 65. With the circuit including cathode 61 in a state of energization and current flow being amplified by the direct current amplifier 73, it will be readily apparent that the stator coils 30a, 30a become energized to produce a magnetic field at stator poles 30, 30. Since the stator coils 29a, 29a are not energized at this time and stator coils 30a, 30a are energized, the magnetic field produced thereby causes the rotor poles 23, 23 which are only partially out of alignment to be brought into alignment with the stator poles by an incremental rotation of the rotor means 20.

As additional pulses are received at A the conducting path of gas in the counter tube is sequentially transferred or switched from cathode 61 to cathode 62 through the intermediate guide pins 54 and 56 therebetween and thence from cathode 62 to cathode 63 in like manner. Each transfer or switching of the conducting path of gas from cathode 61 to 62 and 62 to 63 produces sequential energization of the stator coils 31a, 31a and then 32a, 32a so as to provide incremental rotation of the rotor means 20 as the corresponding rotor poles are brought into alignment with the next adjacent stator poles. Thus, for each pulse received at A, the rotor means 20 is turned a preselected angular amount in a predetermined direction and at a predetermined time.

It is important to note that the circuit arrangement of the direct current amplifiers is such that when no voltage is applied to the input side of the amplifiers, as when the cathode end of the conducting path of gas is being transferred through pins 54, 56 to an adjacent cathode, the final tube 98 of the amplifier is biased to cut off and is inactive. Thus, since only one cathode of the counter tube is capable of conducting current at one time, only one pair of windings of the plurality of pairs of stator poles is energized at one time to produce a magnetic field to cause incremental rotation of the rotor means.

It should also be noted that when the complete circuit is energized, but no pulses are received at A, there is no transfer or switching of the conducting path of gas in the counter tube to an adjacent cathode so that the stator windings last energized will remain energized and the rotor means is locked in that position by the magnetic field produced between stator pole windings. Thus, the rotor means can turn only in response to a pulse received at A and in the absence of such a pulse, the rotor means is positively prevented from any rotation.

When it is desired to turn the rotor means in the opposite or clockwise direction, as described in this example, pulses are fed to the drive system at B and to a multivibrator means 36′. It will be noted that the arrangement of circuit components of the multivibrator means 36′ is such that the first of the two pulses emitted from the multivibrator means will energize the grid 48 of tube 49 so that the pulse emitted from tube 49 will energize guide pin 56 and cause switching or transferring of the conducting path of gas in the counter tube in a clockwise direction as from the cathode 60 to cathode 63 to 62 etc. By energization of cathodes in clockwise arrangement, it will be readily understood that the corresponding associated stator pole windings will also be energized in clockwise sequence so as to produce incremental clockwise rotation of the rotor means 20.

It will be readily apparent to those skilled in the art that other circuitry may be employed in the multivibrator means and in the means for amplifying the potential drop produced upon transfer of the conducting path of gas from one cathode to the adjacent cathode. The preselected incremental rotative response of the rotor means to a selectively spaced pulse received at A of the drive system provides a positive direct means for driving a data recording device on which there is correlation between displacement of the driven member and the recordation of data. The electronic drive system of the above-described invention is not intended to be limited to the particular example described above but is intended to have utility whenever a pulse-actuated, precise, accurate, incremental rotation of a driving or driven member is desired.

It will also be understood that a transistor switching system may be used for the cathode counting tube.

It will be understood by those skilled in the art that numerous changes and modifications may be made in the system described above which come within the spirit of this invention and all such changes and modifications coming within the scope of the appended claims are embraced thereby.

I claim:

1. In a pulse-actuated motor driving system, including a pulse source for emitting selectively a discrete actuating pulse, the combination of: means for emitting one or more spaced pulses in response to said actuating pulse; a gas transfer tube provided with a central anode and a plurality of spaced cathodes arranged around said anode, said tube including transfer guide means between adjacent cathodes, said guide means being sequentially energized by said spaced pulses to cause transfer of a conducting path of electrons between one cathode and said anode to an adjacent cathode and said anode; a motor means having a rotor provided with pairs of rotor poles and a stator provided with pairs of stator poles; and means operatively interconnecting each cathode with a selected pair of stator poles, said pairs of stator poles being sequentially energized for producing incremental rotation of said rotor by successive actuating pulses.

2. A pulse-actuated motor driving system as stated in claim 1 wherein said interconnecting means includes amplifying means between said tube and said stator poles.

3. A system as stated in claim 1 wherein said means for emitting said spaced pulses includes a multivibrator circuit means.

4. In a pulse-actuated motor driving system, including a source of discrete actuating pulses, the combination of: means for emitting at least two closely spaced sequential driving pulses in response to each actuating pulse; a motor means having a rotor provided with a plurality of diametrically arranged pairs of rotor poles and having a stator provided with a plurality of pairs of diametrically arranged stator poles arranged in operative relation; and counter tube means including a cold cathode glow transfer counting tube responsive to said spaced driving pulses to sequentially energize pairs of said stator poles to cause incremental rotation of said rotor, said cold cathode tube including means for transfer of current flow from one cathode to an adjacent cathode in response to said driving pulses.

5. A driving system as stated in claim 4 wherein means are provided to produce a voltage drop upon transfer from one cathode to an adjacent cathode; and means for amplifying said voltage drop at each cathode.

6. In a motor driving system for a step motor having pairs of rotor poles and pairs of stator poles the provision of: responsive means to a signal calling for rotation of a driving member of the motor through one incremental step and including two input pulse driving circuit means, each driving circuit means being adapted to emit spaced sequential driving pulses responsive to each signal received, one circuit means being responsive to a signal calling for rotation in one direction and the other input circuit means being responsive to a signal calling for rotation in the reverse direction; and switching means selectively actuated by said spaced driving pulses of said input circuit means, said switching means including a cathode counter tube means adapted to sequentially transfer current flow in response to said spaced driving pulses for sequentially energizing said pairs of stator poles for producing step-by-step incremental rotation of the driving member in a selected direction.

References Cited in the file of this patent

UNITED STATES PATENTS

| | | |
|---|---|---|
| 2,706,270 | Steele | Dec. 12, 1955 |
| 2,774,026 | Towner | Dec. 11, 1956 |
| 2,941,136 | Marantelte et al. | June 14, 1960 |